US011935720B1

(12) United States Patent
Chen et al.

(10) Patent No.: US 11,935,720 B1
(45) Date of Patent: Mar. 19, 2024

(54) FIELD-EMISSION TYPE ELECTRON SOURCE AND CHARGED PARTICLE BEAM DEVICE USING THE SAME

(71) Applicants: Dazhi Chen, San Jose, CA (US); Zhongwei Chen, Los Altos Hills, CA (US)

(72) Inventors: Dazhi Chen, San Jose, CA (US); Zhongwei Chen, Los Altos Hills, CA (US)

( * ) Notice: Subject to any disclaimer, the term of this patent is extended or adjusted under 35 U.S.C. 154(b) by 0 days.

(21) Appl. No.: 18/491,725

(22) Filed: Oct. 20, 2023

Related U.S. Application Data

(62) Division of application No. 18/157,817, filed on Jan. 21, 2023.

(51) Int. Cl.
*H01J 1/304* (2006.01)

(52) U.S. Cl.
CPC ... *H01J 1/3044* (2013.01); *H01J 2201/30415* (2013.01); *H01J 2201/30426* (2013.01); *H01J 2201/30496* (2013.01)

(58) Field of Classification Search
CPC ........... H01J 1/3044; H01J 2201/30415; H01J 2201/30492; H01J 2201/30449
USPC .......................................................... 313/336
See application file for complete search history.

(56) References Cited

U.S. PATENT DOCUMENTS

2020/0088018 A1* 3/2020 Legg ....................... E21B 36/04

FOREIGN PATENT DOCUMENTS

CN 101752160 A * 6/2010 .............. H01J 1/304
JP 2010272504 A * 12/2010

* cited by examiner

*Primary Examiner* — Christopher M Raabe
(74) *Attorney, Agent, or Firm* — George Guosheng Wang; Upstream Research and Patent LLC

(57) ABSTRACT

A field-emission type electron source includes (i) a single-crystal tungsten rod having a sharpened terminus and (ii) a mass of ZrO formed only on a portion of the surface, or the entire surface, of the sharpened terminus. In preferred design, the single-crystal tungsten rod is placed in a gaseous medium that consists of oxygen and a non-oxygen gas. The molar ratio between oxygen and the non-oxygen gas is greater than 1:1.

20 Claims, 11 Drawing Sheets

01

FIELD-EMISSION TYPE ELECTRON SOURCE AND CHARGED PARTICLE BEAM DEVICE USING THE SAME

FIELD OF THE INVENTION

The present invention generally relates to a field-emission type electron source and charged particle beam devices using the electron source. More particularly, the present invention relates to a thermal field emission cathode which is employed as an electron source in an electron microscope, a semiconductor electron microscope equipment, a critical dimension examine tool, an electron beam tester, an Auger electron spectrometer, an electron beam lithography apparatus, or other electron beam related systems.

BACKGROUND OF THE INVENTION

An electron source or electron gun (also called electron emitter) is an electrical component in some vacuum tubes that produces a narrow, collimated electron beam that has a precise kinetic energy. Its largest application is in cathode-ray tubes (CRTs), used in nearly all television sets, computer displays and oscilloscopes that are not flat-panel displays. They are also used in field-emission displays (FEDs), which are essentially flat-panel displays made of rows of extremely small cathode-ray tubes. They are also used in microwave linear beam vacuum tubes such as klystrons, inductive output tubes, travelling wave tubes, and gyrotrons, as well as in scientific instruments such as electron microscopes and particle accelerators. Electron guns may be classified by the type of electric field generation (DC or RF), by emission mechanism (thermionic, photocathode, cold emission, plasmas source), by focusing (pure electrostatic or with magnetic fields), or by the number of electrodes.

Thermal field emission cathodes may be used in devices such as scanning electron microscopes, transmission electron microscopes, semiconductor inspection systems, and electron beam lithography systems as an electron source. In such devices, an electron source provides electrons, which are then guided into an intense, finely focused beam of electrons having energies within a narrow range. To facilitate formation of such a beam, the electron source should emit a large number of electrons within a narrow energy band. The electrons should be emitted from a small surface area on the source into a narrow cone of emission. Electron sources can be characterized by brightness, which is defined as the electron current divided by the real or virtual product of the emission area and the solid angle through which the electrons are emitted.

Electrons are normally prevented from leaving the atoms at the surface of an object by an energy barrier. The amount of energy required to overcome the energy barrier is known as work function of the surface. A thermionic emission electron source relies primarily on heat to provide the energy to overcome the energy barrier and emit electrons. However, thermionic emission sources are not sufficiently bright for use in many applications.

Another type of electron source is a cold field emission source that operates at room temperature and relies on a strong electric field to facilitate the emission of electrons by tunneling through the energy barrier. A field electron source typically includes a narrow tip at which electrons leaves the surface and are ejected into surrounding vacuum. While cold field emission sources are much smaller and brighter than thermionic emission sources, cold field emission sources exhibit instabilities that cause problems in many applications.

Yet another type of electron source is referred to as a Schottky emission cathode or Schottky emitter. Schottky emitters use a coating on a heated emitter tip to reduce its work function. The coating typically comprises a very thin layer, such as a fraction of a monolayer, of an active metal. In Schottky emission mode, Schottky emitter uses a combination of heat and electric field to emit electrons, which appear to radiate from a virtual point source within the tip. With changes to the emitter temperature and electric field, the Schottky emitter will emit in other emission modes or combinations of emission modes. Schottky emitters are very bright and are more stable and easier to handle than cold field emitters. Because of their performance and reliability benefits, Schottky emitters have become a common electron source for modern electron beam systems.

FIG. 1A shows part of a conventional Schottky emitter 12 described in U.S. Pat. No. 5,449,968 to Terui et al. The Schottky emitter 12 is a portion of a thermal emission cathode as the FIG. 1B presents. The Schottky emitter 12 includes a filament 14 that supports and heats an emitter 16; the emitter 16 having an apex 22 from which the electrons are emitted; and a suppressor electrode 51 to prevent electrons emitting from position other than the apex 22. Heating current is supplied to filament 14 through electrodes 61 that are showed in FIG. 1B. The Schottky emitter 12 typically operates with apex 22 at a temperature of approximately 1,800K. Emitter 16 is typically made from a single crystal of tungsten oriented in the <100>, <110>, <111>, or <310> direction. Emitter 16 could also be made of other materials, such as molybdenum, iridium, or rhenium. Emitter 16 is coated with a coating material to lower its work function. Such coating materials could include, for example, compounds, such as oxide, nitrides, and carbon compound, of zirconium, titanium, hafnium, yttrium, niobium, vanadium, thorium, scandium, beryllium, or lanthanum. For example, coating a (100) surface of tungsten with zirconium and oxygen lowers the work function of the surface from 4.5 eV to 2.8 eV By reducing the energy required to emit electrons, the coating on the emitter 16 makes it a brighter electron source.

At the high temperatures when Schottky emitter 12 operates, the coating material tends to evaporate from emitter 16 and must be continually replenished to maintain the low work function at apex 22. A reservoir 28 of the coating material is typically provided to replenish the coating on emitter 16. The material from reservoir 28 diffuses along the surface and through the bulk of emitter 16 toward apex 22, thereby continually replenishing the coating on the apex 22. At the Schottky emitter 12 operating temperature, not only the coating material on the emitter 16 and apex 22 evaporate, but the coating material also evaporates directly from the reservoir 28, thus depleting it. The evaporation rate of the coating material in the reservoir increases exponentially with the temperature. Thus, the useful life of the reservoir depends upon the amount of material in the reservoir and its temperature.

When reservoir 28 is depleted, Schottky emitter 12 no longer functions properly, and it is necessary to shut down the electron beam system to replace the emitter 16 or the whole Schottky emitter unit 12. This process is time consuming and is costly. It is desirable, therefore, to extend the life of the reservoir 28 as much as possible, thereby extending the life of the emitter 16.

Known electron sources using the coating material such as ZrO are unsatisfactory because of the following drawbacks: (1) diffusion of the ZrO to the apex does not easily happen; (2) the diffusion distance of ZrO is too long; (3) formation of chips or cracks on the ZrO; (4) too much loss of ZrO; (5) the practical life of the electron source is not sufficiently long; (6) higher temperature within the electron source; (7) bigger apex size under high temperature within the electron source; (8) lower resolution; and (9) lower angular intensity.

On the other hand, the emitter 16 is placed in a vacuum environment that does not have a proper amount of oxygen. For example, electron sources using too little oxygen are unsatisfactory because of the following drawbacks: (1) oxygen cannot effectively facilitate the ZrO diffusion for thermal field-emission type electron sources; (2) oxygen cleaning of the tip of $LaB_6$ crystal rod and the $CeB_6$ crystal rod is not effective; (3) oxygen cleaning of the tungsten rod for cold field-emission type electron source is not effective either; (4) higher temperature is demanded within the electron source; (5) bigger apex size under the higher temperature within the electron source; (7) lower resolution; and (7) lower angular intensity.

Therefore, there exists a need to overcome the above problems. Advantageously, the present invention provides solutions for resolving these problems.

SUMMARY OF THE INVENTION

One aspect of the present invention provides a field-emission type electron source comprising (i) a single-crystal tungsten rod having a sharpened terminus extending from a rod body and (ii) a mass of ZrO on a portion of the surface, or the entire surface, of the sharpened terminus. In the field-emission type electron source, (1) the rod body immediately adjacent to the terminus has a diameter Db, (2) the terminus has a length Lt along an elongation direction of the tungsten rod; and (3) the terminus is so sharpened that its diameter Dt (Dt<Db) is decreased non-linearly along the length Lt (or axially) from a value that is slightly smaller than Db to a minimal value Dt0 at the apex of the terminus.

Another aspect of the invention provides a field-emission type electron source comprising (i) a single-crystal tungsten rod having a sharpened terminus extending from a rod body, and (ii) a mass of ZrO formed only on a portion of the surface, or the entire surface, of the sharpened terminus. The rod body immediately adjacent to the terminus has a diameter Db, and the terminus is so sharpened that its diameter Dt (Dt<Db) is decreased to a minimal value Dt0 at the apex of the terminus. No ZrO is formed on the single-crystal tungsten rod except the sharpened terminus.

Still another aspect of the invention provides a field-emission type electron source comprising a crystal rod placed in a gaseous medium. The crystal rod may be a single-crystal tungsten rod, a lanthanum hexaboride $LaB_6$ crystal tip (or rod), or a cerium hexaboride $CeB_6$ crystal tip (or rod). The gaseous medium consists of oxygen and a non-oxygen gas, and a molar ratio between oxygen and the non-oxygen gas is greater than 1:1, 10:1, 50:1, or 100:1.

A further aspect of the invention provides a charged particle beam device comprising a field-emission type electron source characterized by the following (A), (B) or (C):

(A) The field-emission type electron source comprises (i) a single-crystal tungsten rod having a sharpened terminus extending from a rod body, wherein (1) the rod body immediately adjacent to the terminus has a diameter Db, (2) the terminus has a length Lt along an elongation direction of the tungsten rod; and (3) the terminus is so sharpened that its diameter Dt (Dt<Db) is decreased non-linearly along the length Lt (or axially) from a value that is slightly smaller than Db to a minimal value Dt0 at the apex of the terminus; and (ii) a mass of ZrO on a portion of the surface, or the entire surface, of the sharpened terminus.

(B) The field-emission type electron source comprises (i) a single-crystal tungsten rod having a sharpened terminus extending from a rod body, wherein the rod body immediately adjacent to the terminus has a diameter Db, and the terminus is so sharpened that its diameter Dt (Dt<Db) is decreased to a minimal value Dt0 at the apex of the terminus; and (ii) a mass of ZrO formed only on a portion of the surface, or the entire surface, of the sharpened terminus; wherein no ZrO is formed on the single-crystal tungsten rod except the sharpened terminus.

(C) The field-emission type electron source comprises a crystal rod placed in a gaseous medium, wherein the crystal rod is a single-crystal tungsten rod, a LaB6 crystal rod, or a CeB6 crystal rod; wherein the gaseous medium consists of oxygen and a non-oxygen gas, and wherein a molar ratio between oxygen and the non-oxygen gas is greater than 1:1, 10:1, 50:1, or 100:1.

The above features and advantages and other features and advantages of the present invention are readily apparent from the following detailed description of the best modes for carrying out the invention when taken in connection with the accompanying drawings.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements. All the figures are schematic and generally only show parts which are necessary in order to elucidate the invention. For simplicity and clarity of illustration, elements shown in the figures and discussed below have not necessarily been drawn to scale. Well-known structures and devices are shown in simplified form, omitted, or merely suggested, in order to avoid unnecessarily obscuring the present invention.

DETAILED DESCRIPTION OF THE PREFERRED EMBODIMENT

Figure 1A:
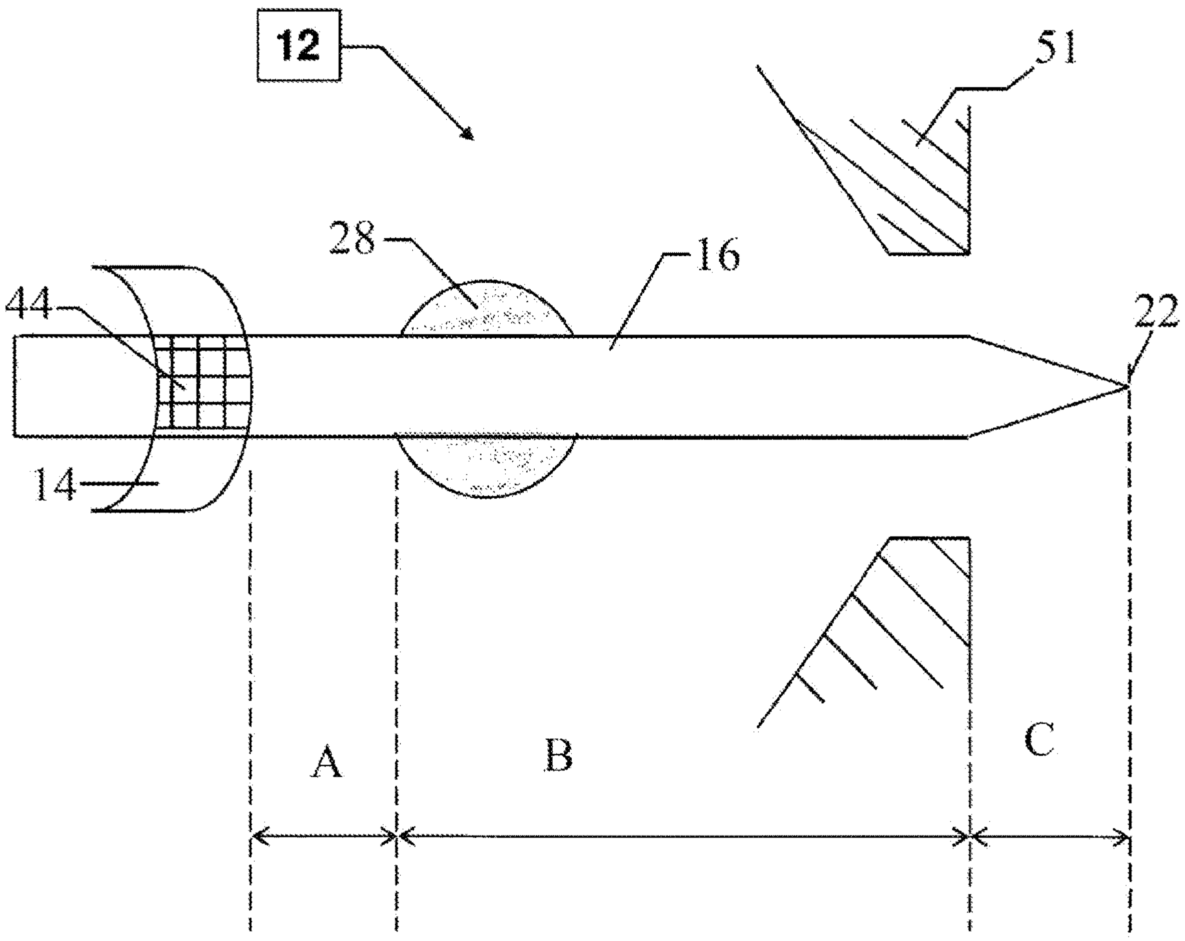
Figure 1A (Prior Art)
FIG. 1A is a schematic representation of a conventional Schottky emitter, which is a portion of a thermal field emission cathode.
Figure 1B:
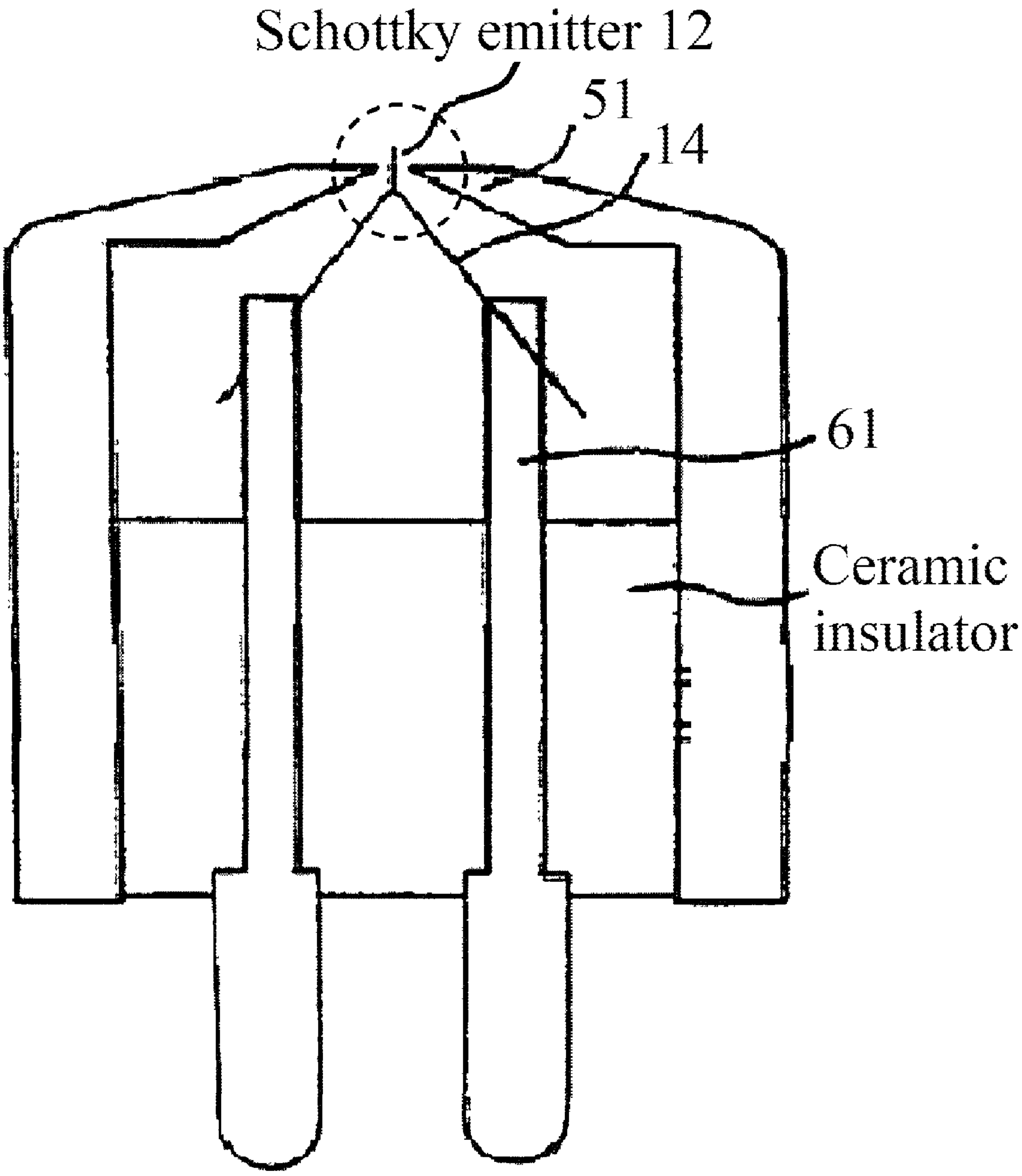
Figure 1B (Prior Art)
FIG. 1B is a schematic representation of a thermal field emission cathode.

In the following description, for the purposes of explanation, numerous specific details are set forth in order to provide a thorough understanding of the present invention. It is apparent, however, to one skilled in the art that the present invention may be practiced without these specific details or with an equivalent arrangement.

Where a numerical range is disclosed herein, unless otherwise specified, such range is continuous, inclusive of both the minimum and maximum values of the range as well as every value between such minimum and maximum values. Still further, where a range refers to integers, only the integers from the minimum value to and including the maximum value of such range are included. In addition, where multiple ranges are provided to describe a feature or characteristic, such ranges can be combined.

It is also to be understood that the terminology used herein is for the purpose of describing particular embodiments only, and is not intended to limit the scope of the invention. For example, when an element is referred to as being "on", "connected to", or "coupled to" another element, it can be directly on, connected or coupled to the other element or intervening elements may be present. In contrast, when an element is referred to as being "directly on", "directly connected to", or "directly coupled to" another element, there are no intervening elements present.

Throughout the specification and claims, the following terms take the meanings explicitly associated herein, unless the context clearly dictates otherwise. The phrase "in one embodiment" does not necessarily refer to the same embodiment, although it may. Furthermore, the phrase "in another embodiment" does not necessarily refer to a different embodiment, although it may. Thus, as described below, various embodiments of the invention may be readily combined without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Referring again to FIG. 1A, the conventional Schottky emitter 12 in the prior art positioned the ZrO reservoir 28 on the emitter 16 away from the junction 44 towards apex 22. Positioning ZrO reservoir 28 away from junction 44 allows the reservoir 28 to remain cooler during operation, thereby reducing evaporation of the coating material such as ZrO and increasing the useful life of Schottky emitter. Positioning the reservoir 28 too close to apex 22, the shape of the reservoir may adversely contact the suppressor 51. Even if the reservoir 28 does not contact the suppressor 51, a micro-arcing will be induced between the reservoir 28 and the suppressor 51. The prior art optimum position for the reservoir 28 is at approximately 200 micrometers from junction 44 toward apex 22. At such a position, the reservoir temperature is cooler than that of junction 44, but it is still way hotter than apex 22. Evaporation and depletion of the coating material of reservoir 28 is still the limiting factor of the useful life of the Schottky emitter 12.

The conventional Schottky emitter 12 in FIG. 1A can be separated into 3 portions. Portion "A" from junction 44 to reservoir 28, the optimum length of the portion "A" is approximately 200 micrometers. Portion "B" from reservoir 28 to suppressor electrode 51, the optimum length of the portion "B" is approximately 900 micrometers. Portion "C" from suppressor electrode 51 to apex 22, the optimum length of the portion "C" is approximately 250 micrometers. As mentioned above, heat is conducted from junction 44 to the apex 22. As the apex 22 working temperature 1800K, the conventional emitter design will have a temperature above 1930K at junction 44. The reservoir 28, 200 micrometers away from the junction, may experience a temperature in the range of 1910K to 1870K. Positioning the reservoir 28 closer toward the apex 22 could have cooler temperature, but this may induce contact or micro-arcing issue between the reservoir 28 and the suppressor 51.

Figure 2A:
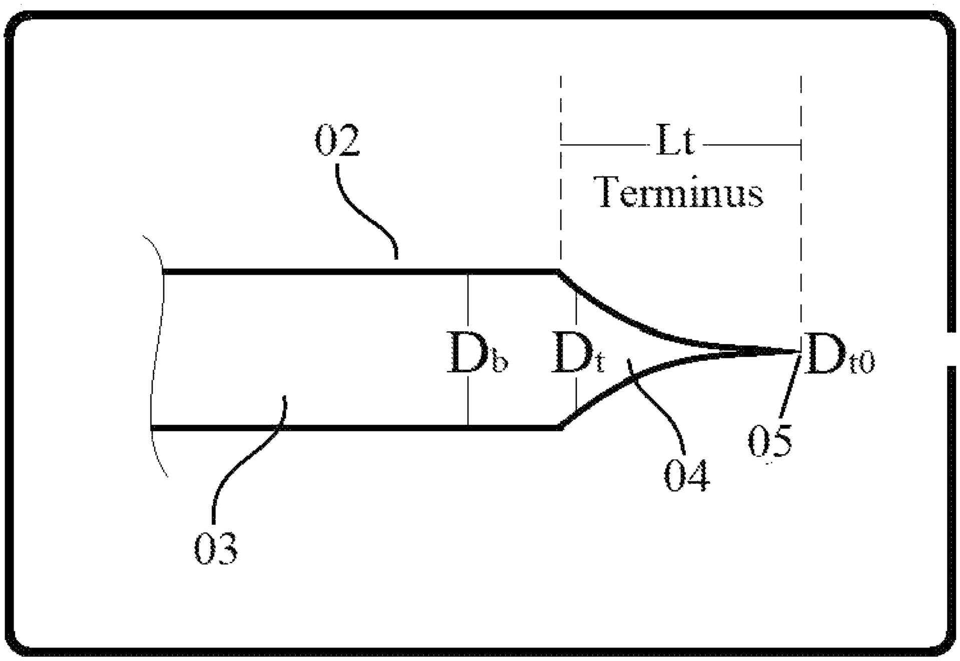
FIG. 2A schematically illustrates a field-emission type electron source using a single-crystal tungsten rod in accordance with an exemplary embodiment of the present invention.

We have solved these problems. With reference to FIG. 2A, a field-emission type electron source 01 of the present invention includes a single-crystal tungsten rod 02 (or an emitter 02) having a sharpened terminus 04 extending from a rod body 03. The tungsten rod 02 is connected to a filament (not shown) at a welded junction (not shown). Because heat is supplied to tungsten rod 02 from the filament, the tungsten rod 02 is hottest at the welded junction and is cooler as the distance from the welded junction increases. The rod body 03 immediately adjacent to the terminus 04 has a diameter Db. The terminus 04 has a length Lt along an elongation direction of the tungsten rod 02. The terminus 04 is so sharpened that its diameter Dt ($Dt<Db$) is decreased non-linearly along the length Lt (or axially) from a value that is slightly smaller than Db to a minimal value Dt0 at the apex 05 of the terminus 04, wherefrom field emission electrons are released.

Figure 2B:
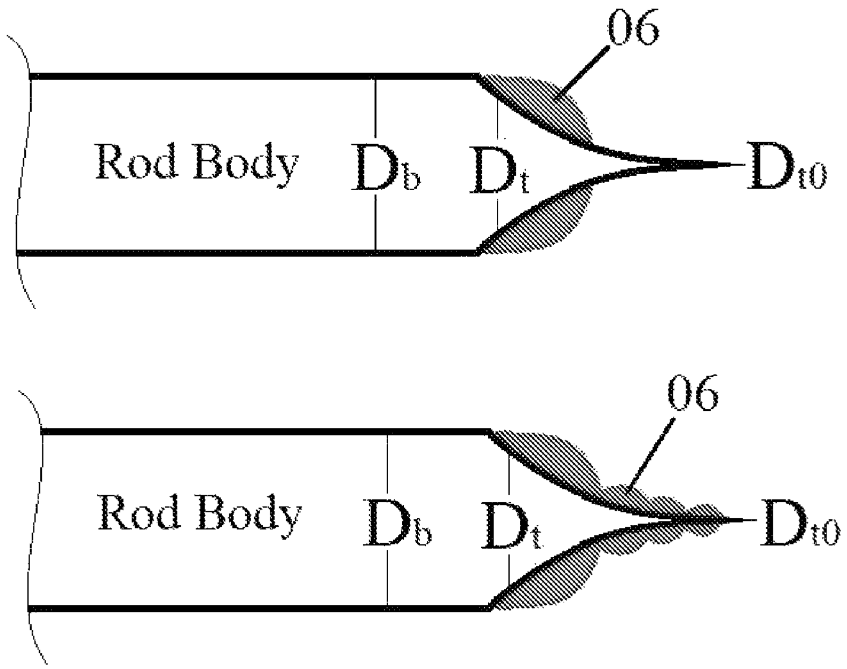
FIG. 2B schematically illustrates a mass of ZrO coated on the sharpened terminus of single-crystal tungsten rod in accordance with an exemplary embodiment of the present invention.

With reference to FIG. 2B, a mass of ZrO 06 is placed on a portion of the surface, or the entire surface, of the sharpened terminus 04. This can avoid electric induced instability of the field emission cathode. In preferred embodiments, the mass of ZrO 06 is formed only on a portion of the surface, or the entire surface, of the sharpened terminus 04. In other words, no ZrO is formed on the single-crystal tungsten rod 02 except the sharpened terminus 04. This design shortens the distance that ZrO 06 needs to diffuse to apex 05 in the meantime increases the volume of ZrO 06, and therefore extends the lifetime of the improved Schottky emitter. This embodiment also overcomes the aforementioned contact or micro-arcing issue during the emitter operations. It should be appreciated that a mass of other compounds, such as oxide, nitrides, and carbide compound of zirconium, titanium, hafnium, yttrium, niobium, vanadium, thorium, scandium, beryllium, or lanthanum may be similarly placed on a portion of the surface, or the entire surface, of the sharpened terminus 04.

Any known methods may be employed to form ZrO 06 on a portion of the surface, or the entire surface, of the sharpened terminus 04. For example, a slurry-like gel where zirconia or zirconium fine particles or zirconium hydride is mixed in an organic solvent or the like is adhered to the sharpened terminus 04, using a tool like an ink brush, a dropper, or a syringe, and then is heated in a vacuum state and sintered. In the case of zirconium or zirconium hydride, the process of performing oxidization by, for example, heating in oxygen gas is added thereafter.

After being coated, ZrO 06 may be supplied onto a tungsten crystal plane such as plane (100) on apex 05 by diffusion (such as thermal diffusion) to form a region with a low work function. By applying a strong electric field, thermoelectrons that surpass a potential barrier and electrons transmitted by the tunnel effect can be extracted.

Figure 3:
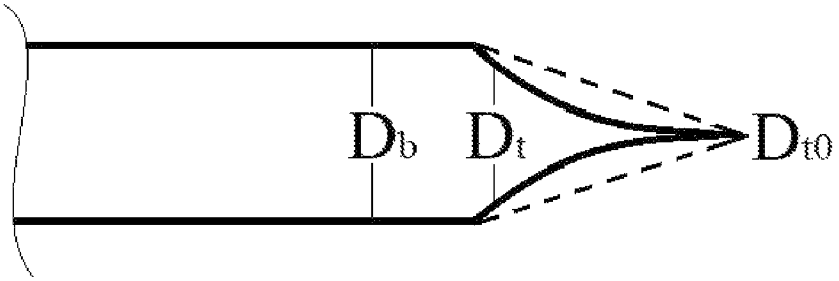
FIG. 3 schematically illustrates profiles of "linearly tapered terminus" and "non-linearly tapered terminus" of single-crystal tungsten rod in accordance with an exemplary embodiment of the present invention.

Referring to FIG. 3, the dotted lines are conceptual, and they illustrate a profile of "linearly tapered terminus" or "linearly sharpened terminus" in which the diameter Dt of terminus 04 is decreased linearly along the length Lt (or axially) from a value that is slightly smaller than Db to a minimal value Dt0 at the apex 05 of the terminus 04. In some embodiments, the actual terminus 04 is sharpened to a profile of "non-linearly tapered terminus" or "non-linearly sharpened terminus" in which its diameter Dt (Dt<Db) is not decreased linearly along the length Lt. In other words, in a profile of "non-linearly tapered terminus," diameter Dt is decreased non-linearly along the length Lt. For example, the diameter Dt at some positions along the elongation direction of the terminus may be smaller than, while the diameter Dt at other positions along the elongation direction of the terminus may be greater than, the would-be Dt at the same positions if the terminus's diameter Dt is decreased linearly along the length Lt from a value that is slightly smaller than Db to a minimal value Dt0 at the apex 05 of the terminus 04. It is also contemplated that the diameter Dt at some positions along the elongation direction of the terminus may be equal to the would-be Dt at the same positions.

Figure 4:
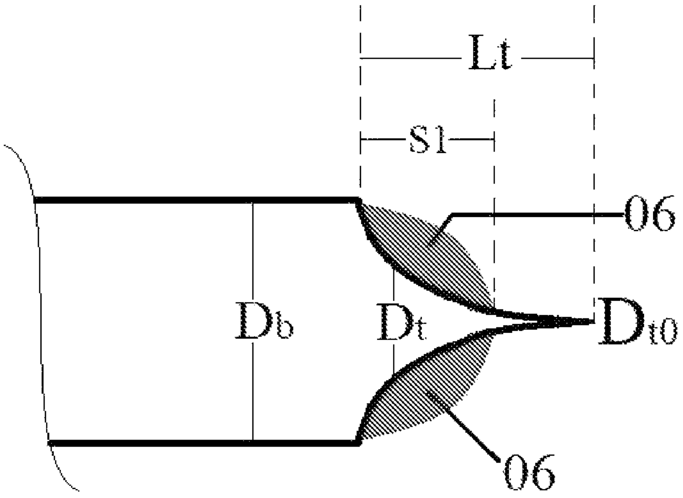
FIG. 4 schematically illustrates a mass of ZrO coated on a preferred "non-linearly tapered terminus" of a single-crystal tungsten rod in accordance with an exemplary embodiment of the present invention.

In preferred embodiments as shown in FIG. 3, the diameter Dt at any position P of the terminus is smaller than the would-be Dt at the same position P in the profile of "linearly tapered terminus." FIG. 4 shows another preferred "non-linearly tapered terminus" in which diameter Dt is decreased more dramatically than FIG. 3.

The profile of "linearly tapered terminus" may be obtained or sharpened by AC electrolytic polishing. In contrast, the profile of "non-linearly tapered terminus" as shown in FIG. 3 or 4 may be obtained or sharpened by DC electrolytic polishing, such as W(100) DC electrolytic polishing, and used in electron sources configured for thermal field emission. The single-crystal tungsten rod may have a W(100) tip facet (or apex facet) in the sharpened terminus. In order to emit an electron beam from an electron source, such as a cold field emitter (CFE) and a Schottky emitter (SE), Dt0 has to be thin in the nanometer order because sufficiently intense electric field is applied to the apex 05. A typical electron source may be manufactured by sharpening a thin metal wire such as rod 02 at the end by electrolytic polishing. Electrolytic polishing is a technique to sharpen the metal wire in electrolyte, applying voltage for electrolysis to melt the metal wire. In case of using SE, it is required to have a proper Dt0 according to the property such as the amount of the beam current, the width of the beam energy, the stability of the beam and so on. Other methods to sharpen the wire include heat-treating, dry etching and ion etching to have the desired diameter Dt0.

Electrolytic polishing is a technique of soaking a thin wire into electrolyte solution, followed by application of voltage, thus fabricating a sharpened tip end or terminus 04. The terminus 04 may have different shapes between DC voltage and AC voltage applied (hereinafter polishing by DC voltage is called DC electrolytic polishing and polishing by AC voltage is called AC electrolytic polishing). When a tungsten monocrystal thin wire having axial orientation of <100> polished, the resultant tip end has a different angle at a conical part (cone angle) between the DC electrolytic polishing and the AC electrolytic polishing. When the tip end is sharpened by DC electrolytic polishing, the tip end is polished like a curve, and the cone angle alpha is 10 degree or less. On the other hand, when the tip end is sharpened by AC electrolytic polishing, the cone angle of the tip can be made large of 15 degree or more. When a tip having the cone angle of 10 degree or less is used as an electron source, deformation of the tip end due to atoms moving at the surface is less, meaning good stability of the emission current. When the cone angle is small, electric field generated around the tip is easily concentrated on the tip when voltage is applied to the tip. That is, this has advantages that a power supply of small capacity is enough to emit a certain amount of current. For more details related to DC and AC electrolytic polishings, please see US Published Application 2015/0255240A1, which is incorporated herein by reference.

As shown in FIGS. 2B and 4, the mass of ZrO 06 may be formed on the surface of a segment S1 of the sharpened terminus 04 immediately adjacent to the rod body 03. The segment may have a length of (30~80)%×Lt along the elongation direction of the tungsten rod 02. In various exemplary embodiments of the invention, Db may be in the range of from 0.1 mm to 0.2 mm, and Lt may be in the range of from 0.15 mm to 0.2 mm. In preferred embodiments, the single-crystal tungsten rod 02 is used as a ZrO/W(100) Schottky cathode.

Various embodiments of the invention provide a field-emission type electron source 01 as shown in FIGS. 2A and 2B. The electron source 01 includes (i) a single-crystal tungsten rod 02 having a sharpened terminus 04 extending from a rod body 03, wherein the rod body 03 immediately adjacent to the terminus 04 has a diameter Db, and the terminus 04 is so sharpened that its diameter Dt (Dt<Db) is decreased to a minimal value Dt0 at the apex 05 of the terminus 04; and (ii) a mass of ZrO 06 formed only on a portion of the surface, or the entire surface, of the sharpened terminus 04. In other words, no ZrO is formed on the single-crystal tungsten rod 02 except the sharpened terminus 04.

As shown in FIG. 2A, the terminus 04 has a length Lt along an elongation direction of the tungsten rod 02. As previously described, the diameter Dt may be decreased non-linearly along the length Lt from a value that is slightly smaller than Db to a minimal value Dt0 at the apex 05 of the terminus 04. Such a terminus may be sharpened by DC electrolytic polishing.

In preferred embodiments, the diameter Dt at any position of the terminus 04 is smaller than the would-be Dt at the same position if the terminus's diameter Dt is decreased linearly along the length Lt from a value that is slightly smaller than Db to a minimal value Dt0 at the apex of the terminus. Such a terminus may be sharpened by W(100) or W(310) DC electrolytic polishing, and the electron source is configured for thermal field emission.

In other embodiments, the terminus 04 may have a length Lt along an elongation direction of the tungsten rod 02; and the diameter Dt is decreased linearly along the length Lt from a value that is slightly smaller than Db to a minimal value Dt0 at the apex 05 of the terminus 04. Such a terminus may be sharpened by AC electrolytic polishing.

In preferred embodiments as shown in FIGS. 2B and 4, the mass of ZrO 06 may be formed on the surface of a segment S1 of the sharpened terminus 04 immediately adjacent to the rod body 03, and the segment S1 may have a length of (30~80)%×Lt along the elongation direction of the tungsten rod 02.

In various embodiments, Db may be in the range of from 0.1 mm to 0.2 mm. Dt0 may be in the range of from 4 nm (DC electrolytic polishing) to 300 nm (AC electrolytic polishing). The terminus 04 may have a length Lt along an elongation direction of the tungsten rod 02 and Lt may be in the range of from 0.15 mm to 0.2 mm.

Figure 5:
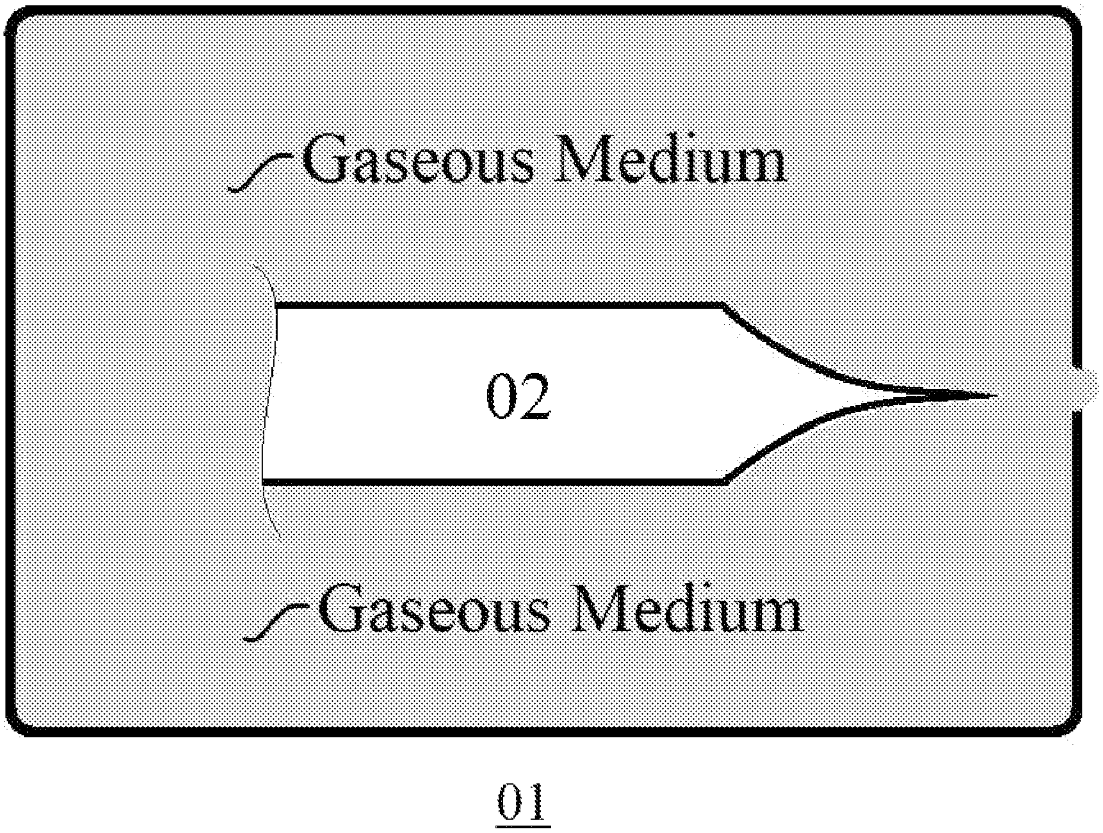
FIG. 5 depicts a field-emission type electron source using a crystal rod placed in a gaseous medium in accordance with an exemplary embodiment of the present invention.

Referring to FIG. 5, still another aspect of the invention provides a field-emission type electron source 01 comprising a crystal rod 02 placed in a gaseous medium. The crystal rod 02 may be a single-crystal tungsten rod, a $LaB_6$ crystal rod, or a $CeB_6$ crystal rod. The gaseous medium may consist of oxygen gas and non-oxygen gas. The molar ratio between oxygen and the non-oxygen gas may be greater than 1:1, 10:1, 50:1, or 100:1.

Hexaborides such as lanthanum hexaboride ($LaB_6$) and cerium hexaboride ($CeB_6$) are refractory ceramic materials with low work functions, around 2.5 eV. They are also somewhat resistant to cathode poisoning. As such, the principal use of these hexaborides is in hot cathodes, either as a single crystal or as a coating deposited by physical vapor deposition. Cerium hexaboride cathodes have a lower evaporation rate at 1700 K than lanthanum hexaboride, but they become equal at temperatures above 1850 K. Cerium hexaboride cathodes have one and half the lifetime of lanthanum hexaboride, due to the former's higher resistance to carbon contamination. Hexaboride cathodes are about ten times "brighter" than tungsten cathodes, and they have 10-15 times longer lifetime. $CeB_6$ has proven to be more resistant to the negative impact of carbon contamination than $LaB_6$.

Figure 6:
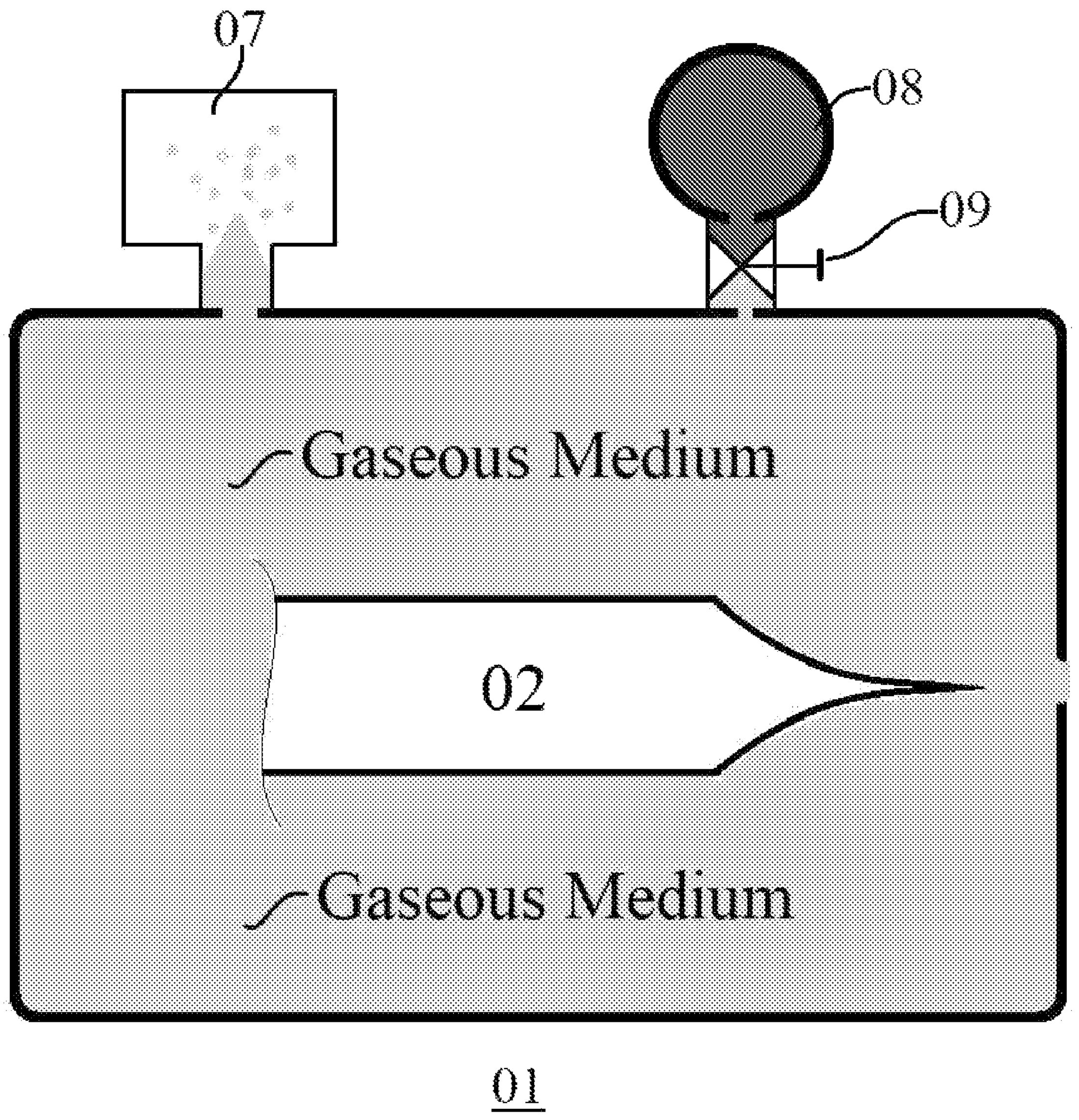
FIG. 6 schematically shows the detailed structure of a field-emission type electron source using a crystal rod placed in a gaseous medium in accordance with an exemplary embodiment of the present invention.

Examples of the non-oxygen gas in the gaseous medium include, but are not limited to, $H_2$, $N_2$, CO, or any mixture thereof. The gaseous medium may maintain a pressure of from about $10^{-11}$ torr to $10^{-8}$ torr within the electron source 01. In some embodiments as shown in FIG. 6, the field-emission type electron source 01 may further include a vacuum pump 07 and an oxygen provider 08 such as an oxygen tank with a releasing valve 09. In an exemplary embodiment, the gaseous medium is formed by (i) vacuuming an air medium within the electron source 01 to a first pressure P1; (ii) releasing oxygen from the oxygen provider 08 into the air medium from step (i) to generate a gaseous medium having a second pressure P2, and P2>P1; and (iii) dynamically maintaining the second pressure P2 of the gaseous medium by continuously vacuuming the electron source 01 while continuously releasing oxygen into the electron source 01 in a controlled way. P1 may be in the range of about $10^{-12}$ torr~ $10^{-9}$ torr, P2 is in the range of about $10^{-11}$~$10^{-8}$ torr, and P2 is always greater than P1.

Figure 7:
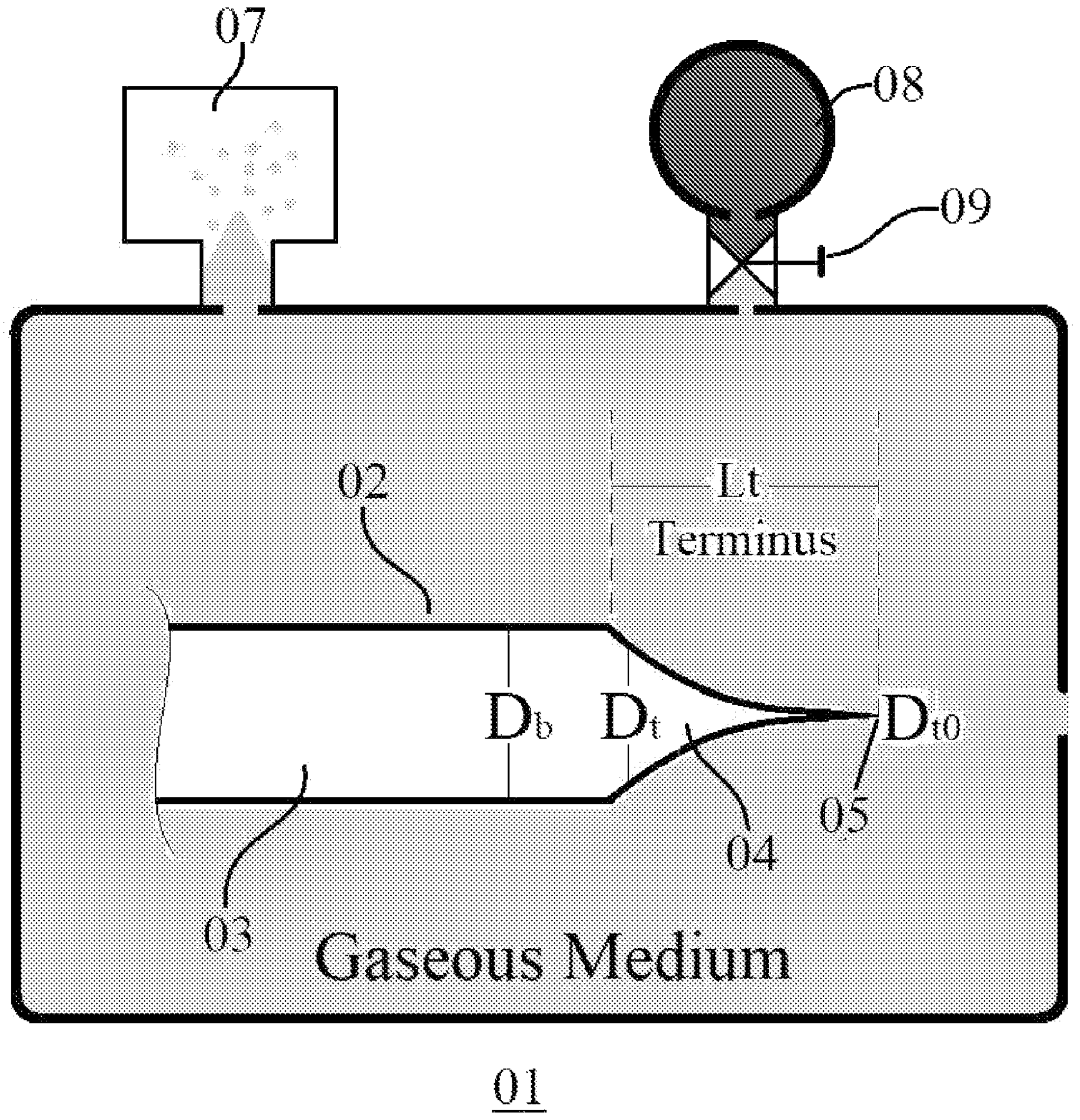
FIG. 7 schematically shows a field-emission type electron source using a crystal rod (without any ZrO coated thereon) placed in a gaseous medium in accordance with an exemplary embodiment of the present invention.

As shown in FIG. 7, the crystal rod 02 may have a sharpened terminus 04 extending from a rod body 03. The rod body 03 immediately adjacent to the terminus 04 has a diameter Db, and the terminus 04 is so sharpened that its diameter Dt (Dt<Db) is decreased to a minimal value Dt0 at the apex 05 of the terminus 04. Although the crystal rod 02 may be a LaB6 crystal rod, or a CeB6 crystal rod, in preferred embodiments, the crystal rod 02 is a single-crystal tungsten rod. The terminus 04 may have a length Lt along an elongation direction of the tungsten rod 02. Similarly, the terminus 04 may be so sharpened that its diameter Dt (Dt<Db) is decreased non-linearly along the length Lt from a value that is slightly smaller than Db to a minimal value Dt0 at the apex 05 of the terminus 05. In FIG. 7, no ZrO is formed onto any portion of the surface of the crystal rod 02.

The crystal rod may be selected from a single-crystal tungsten rod with a W(110) tip facet (or apex facet) in the sharpened terminus, a single-crystal tungsten rod with a W(310) tip facet (or apex facet) in the sharpened terminus, a LaB6 crystal rod, and a CeB6 crystal rod; and the electron source is configured for cold field emission.

Figure 8:
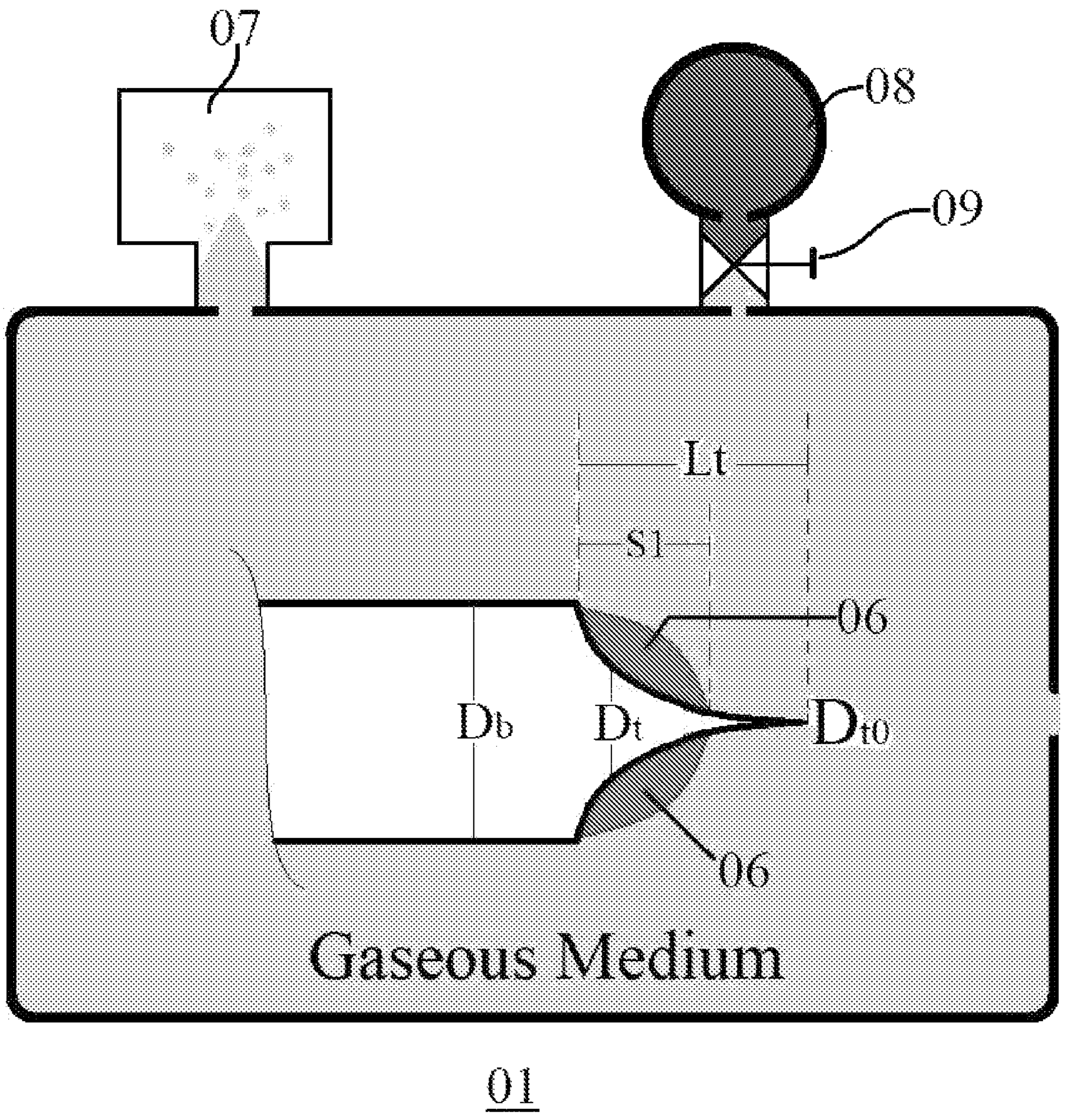
FIG. 8 schematically shows a field-emission type electron source using a crystal rod (with ZrO coated on its non-linearly tapered terminus) placed in a gaseous medium in accordance with an exemplary embodiment of the present invention.

As shown in FIG. 8, a mass of ZrO may be formed on a portion of the surface, or the entire surface, of the sharpened terminus 04 of the single-crystal tungsten rod 02. Preferably, such electron source is configured for thermal field emission. The diameter Dt at any position P of the terminus is preferably smaller than the would-be Dt at the same position P (a "slimmer terminus") if the terminus's diameter Dt is decreased linearly along the length Lt from a value that is slightly smaller than Db to a minimal value Dt0 at the apex 05 of the terminus 04, such as in the terminus that is sharpened by AC electrolytic polishing. Such a "slimmer" terminus 04 may be sharpened by DC electrolytic polishing such as W(100) DC electrolytic polishing or W(310) DC electrolytic polishing, and the electron source 01 is configured for thermal field emission. The mass of ZrO 06 may be formed on the surface of a segment S1 of the sharpened terminus 04 immediately adjacent to the rod body 02. The segment may have a length of (30~80)%×Lt along the elongation direction of the tungsten rod 02. As previously described, Db is in the range of from 0.1 mm to 0.2 mm, and wherein Lt is in the range of from 0.15 mm to 0.2 mm.

Figure 9:
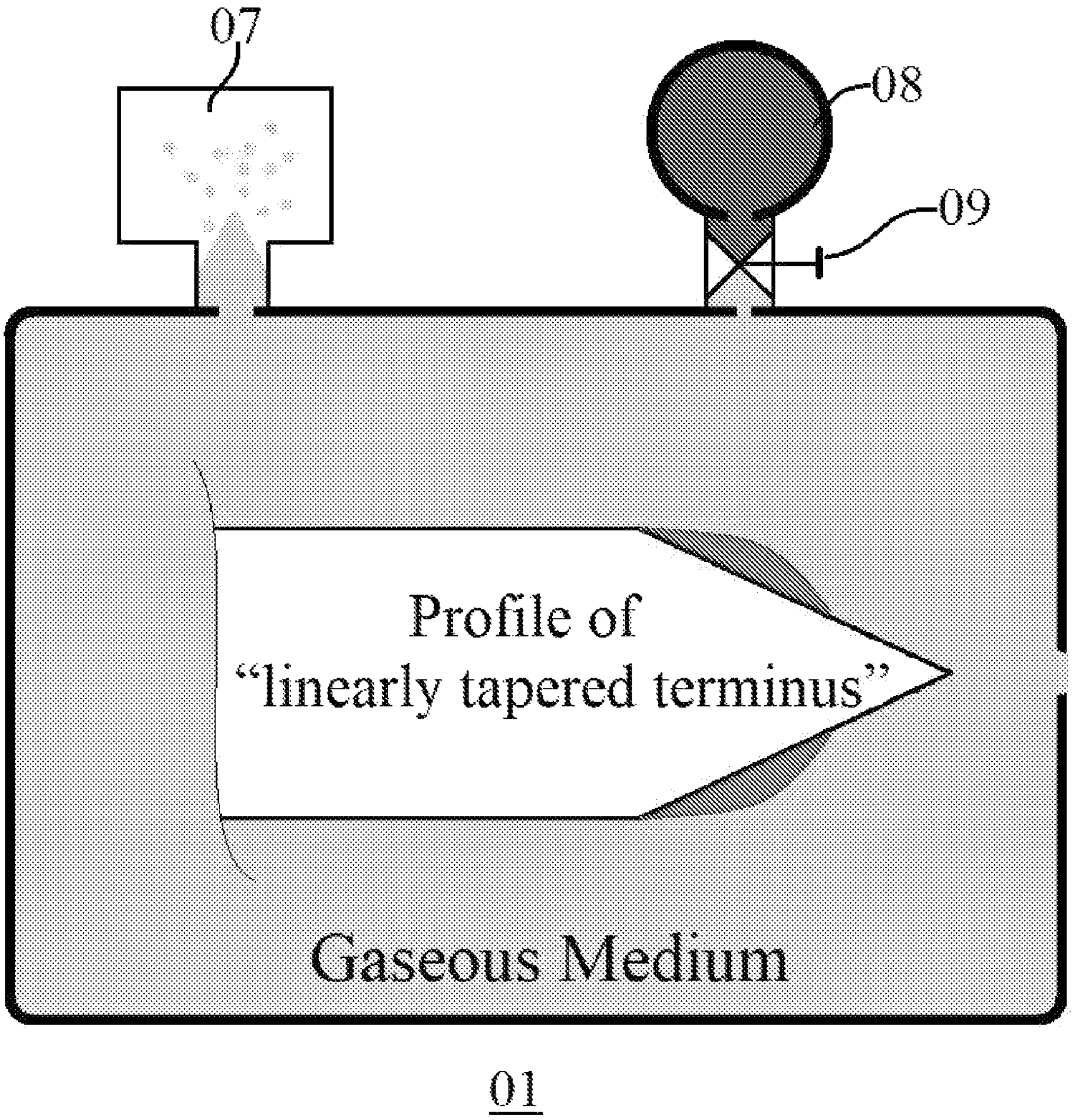
FIG. 9 schematically shows a field-emission type electron source using a crystal rod (with ZrO coated on its linearly tapered terminus) placed in a gaseous medium in accordance with an exemplary embodiment of the present invention.

Referring again to FIG. 8, in the field-emission type electron source 01, the crystal rod 02 is a single-crystal tungsten rod. The mass of ZrO 06 is formed only on a portion of the surface, or the entire surface, of the sharpened terminus 04. No ZrO is formed on the single-crystal tungsten rod 02 except the sharpened terminus 04. Terminus 04 has a length Lt along an elongation direction of the tungsten rod 02. The diameter Dt is decreased non-linearly along the length Lt from a value that is slightly smaller than Db to a minimal value Dt0 at the apex 05 of the terminus 04. Such terminus may be sharpened by DC electrolytic polishing such as W(100) or W(310) DC electrolytic polishing, and the electron source is configured for thermal field emission. The diameter Dt at any position of the "slimmer" terminus 04 may be smaller than the would-be Dt at the same position if the terminus's diameter Dt is decreased linearly along the length Lt from a value that is slightly smaller than Db to a minimal value Dt0 at the apex 05 of the terminus 04. However, the diameter Dt may also be decreased linearly along the length Lt from a value that is slightly smaller than Db to a minimal value Dt0 at the apex of the terminus, as shown in FIG. 9. Such a terminus in FIG. 9 may be sharpened by AC electrolytic polishing.

As previously described, the mass of ZrO 06 may be formed on the surface of a segment S1 of the sharpened terminus 04 immediately adjacent to the rod body 03. The segment S1 may have a length of (30~80)%×Lt along the elongation direction of the tungsten rod 02. Db is in the range of from 0.1 mm to 0.2 mm. Dt0 is in the range of from 4 nm (DC electrolytic polishing) to 300 nm (AC electrolytic polishing). The terminus 04 may have a length Lt along an elongation direction of the tungsten rod and Lt is in the range of from 0.15 mm to 0.2 mm.

Figure 10:
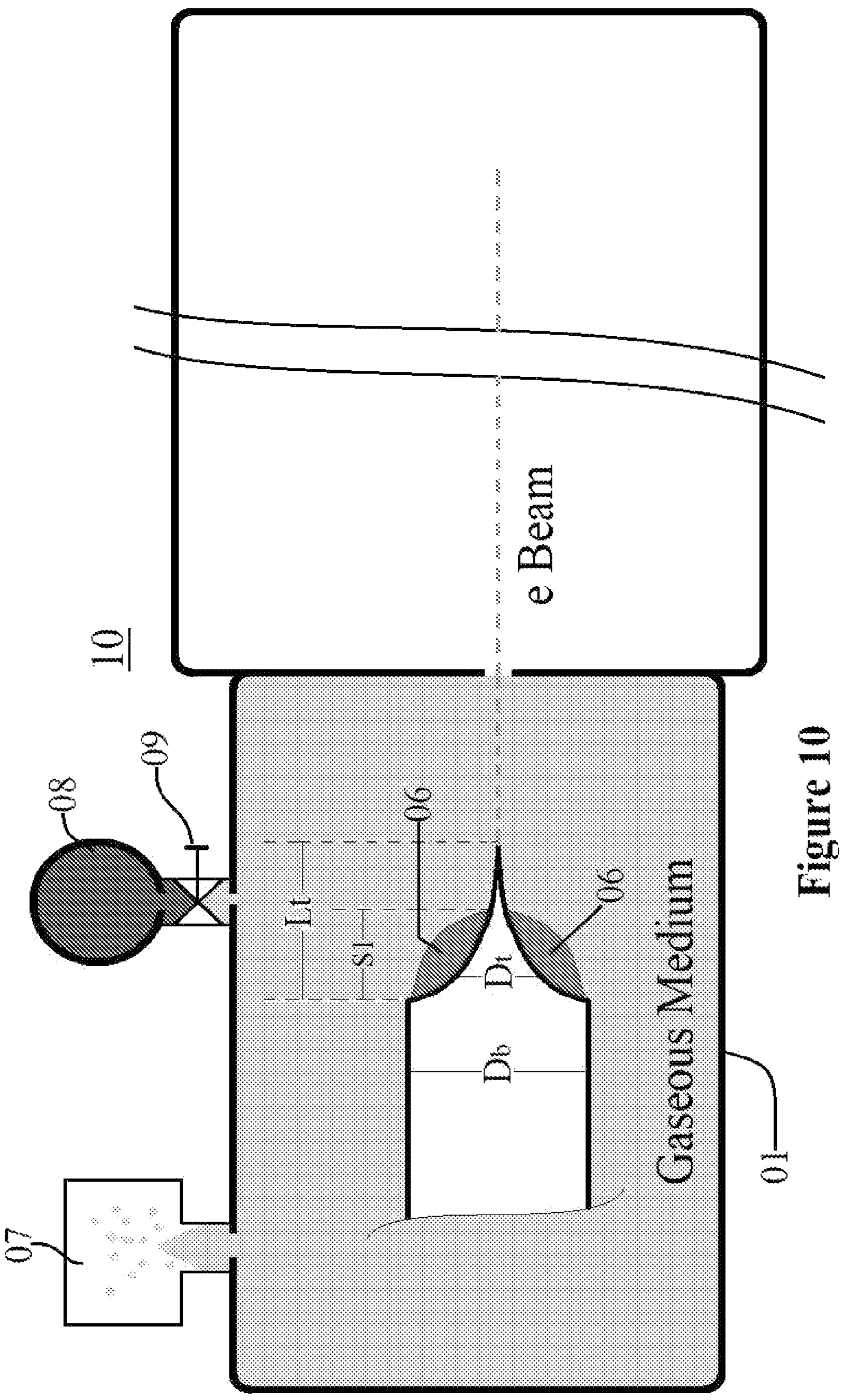
FIG. 10 schematically illustrates a charged particle beam device using one of the field-emission type electron sources in accordance with an exemplary embodiment of the present invention.

As shown in FIG. 10, a further aspect of the invention provides a charged particle beam device 10 comprising one of the field-emission type electron sources (A or B or C) as described above. In (A), the field-emission type electron source comprises (i) a single-crystal tungsten rod having a sharpened terminus extending from a rod body, wherein (1) the rod body immediately adjacent to the terminus has a diameter Db, (2) the terminus has a length Lt along an elongation direction of the tungsten rod; and (3) the terminus is so sharpened that its diameter Dt (Dt<Db) is decreased non-linearly along the length Lt from a value that is slightly smaller than Db to a minimal value Dt0 at the apex of the terminus; and (ii) a mass of ZrO on a portion of the surface, or the entire surface, of the sharpened terminus.

In (B), the field-emission type electron source comprises (i) a single-crystal tungsten rod having a sharpened terminus extending from a rod body, wherein the rod body immediately adjacent to the terminus has a diameter Db, and the terminus is so sharpened that its diameter Dt (Dt<Db) is decreased to a minimal value Dt0 at the apex of the terminus; and (ii) a mass of ZrO formed only on a portion of the surface, or the entire surface, of the sharpened terminus; wherein no ZrO is formed on the single-crystal tungsten rod except the sharpened terminus.

In (C), the field-emission type electron source comprises a crystal rod placed in a gaseous medium, wherein the crystal rod is a single-crystal tungsten rod, a LaB6 crystal rod, or a CeB6 crystal rod; wherein the gaseous medium consists of oxygen and a non-oxygen gas, and wherein a molar ratio between oxygen and the non-oxygen gas is greater than 1:1, 10:1, 50:1, or 100:1.

In some embodiments, the charged particle beam device 10 may include two of the field-emission type electron sources such as (A+B). Specifically, the field-emission type electron source comprises (i) a single-crystal tungsten rod having a sharpened terminus extending from a rod body, wherein (1) the rod body immediately adjacent to the terminus has a diameter Db, (2) the terminus has a length Lt along an elongation direction of the tungsten rod; and (3) the terminus is so sharpened that its diameter Dt (Dt<Db) is decreased non-linearly along the length Lt from a value that is slightly smaller than Db to a minimal value Dt0 at the apex of the terminus; and (ii) a mass of ZrO formed only on a portion of the surface, or the entire surface, of the sharpened terminus; wherein no ZrO is formed on the single-crystal tungsten rod except the sharpened terminus.

In some embodiments, the charged particle beam device 10 may include two of the field-emission type electron sources such as (A+C). Specifically, the field-emission type electron source comprises (i) a single-crystal tungsten rod having a sharpened terminus extending from a rod body, wherein (1) the rod body immediately adjacent to the terminus has a diameter Db, (2) the terminus has a length Lt along an elongation direction of the tungsten rod; and (3) the terminus is so sharpened that its diameter Dt (Dt<Db) is decreased non-linearly along the length Lt from a value that is slightly smaller than Db to a minimal value Dt0 at the apex of the terminus; and (ii) a mass of ZrO on a portion of the surface, or the entire surface, of the sharpened terminus; wherein the single-crystal tungsten rod is placed in a gaseous medium; and wherein the gaseous medium consists of oxygen and a non-oxygen gas, and wherein a molar ratio between oxygen and the non-oxygen gas is greater than 1:1, 10:1, 50:1, or 100:1.

In some embodiments, the charged particle beam device 10 may include two of the field-emission type electron sources such as (B+C). Specifically, the field-emission type electron source comprises (i) a single-crystal tungsten rod having a sharpened terminus extending from a rod body, wherein the rod body immediately adjacent to the terminus has a diameter Db, and the terminus is so sharpened that its diameter Dt (Dt<Db) is decreased to a minimal value Dt0 at the apex of the terminus; and (ii) a mass of ZrO formed only on a portion of the surface, or the entire surface, of the sharpened terminus; wherein no ZrO is formed on the single-crystal tungsten rod except the sharpened terminus; wherein the single-crystal tungsten rod is placed in a gaseous medium; and wherein the gaseous medium consists of oxygen and a non-oxygen gas, and wherein a molar ratio between oxygen and the non-oxygen gas is greater than 1:1, 10:1, 50:1, or 100:1.

In some embodiments, the charged particle beam device 10 may include all the three field-emission type electron sources as described above (A+B+C). Specifically, the field-emission type electron source comprises (i) a single-crystal tungsten rod having a sharpened terminus extending from a rod body, wherein (1) the rod body immediately adjacent to the terminus has a diameter Db, (2) the terminus has a length Lt along an elongation direction of the tungsten rod; and (3) the terminus is so sharpened that its diameter Dt (Dt<Db) is decreased non-linearly along the length Lt from a value that is slightly smaller than Db to a minimal value Dt0 at the apex of the terminus; and (ii) a mass of ZrO formed only on a portion of the surface, or the entire surface, of the sharpened terminus; wherein no ZrO is formed on the single-crystal tungsten rod except the sharpened terminus; wherein the single-crystal tungsten rod is placed in a gaseous medium; and wherein the gaseous medium consists of oxygen and a non-oxygen gas, and wherein a molar ratio between oxygen and the non-oxygen gas is greater than 1:1, 10:1, 50:1, or 100:1.

For the charged particle beam device 10, effects of said ZrO include one or more of the following: (1) making the ZrO diffusion to the apex more easily to happen; (2) shorter diffusion distance for ZrO; (3) preventing or alleviating the formation of chips or cracks on the ZrO; (4) less loss of ZrO; (5) extending the practical life of the thermal field-emission type electron source; (6) lower temperature within the thermal field-emission type electron source; (7) smaller apex size under lower temperature within the electron source; (8) higher resolution; and (9) higher angular intensity, for example greater than 50%, 100%, 150% or even 200% improvement of angular intensity (e.g. from 1 mA/sr to 3 mA/sr). Effects of said oxygen in the gaseous medium (if any) include one or more of the following: (1) facilitating the ZrO diffusion for thermal field-emission type electron source; (2) cleaning containments caused by H2 and CO on the tip of LaB6 crystal rod and the CeB6 crystal rod for cold field-emission type electron source; (3) cleaning containments caused by H2 and CO on the tip of the tungsten rod (110) and (310) for cold field-emission type electron source; (4) lower temperature within the electron source for thermal field-emission type electron source; (5) smaller apex size under lower temperature within the electron source field-emission type electron source; (6) higher resolution; and (7) higher angular intensity, for example greater than 50%, 100%, 150% or even 200% improvement of angular intensity (e.g. from 1 mA/sr to 3 mA/sr).

Examples of the charged particle beam device 10 include, but are not limited to, an electron microscope, a semiconductor electron microscope equipment, a critical dimension examine tool, an electron beam tester, an Auger electron spectrometer, an electron beam lithography apparatus, or other electron beam related systems.

Figure 11:
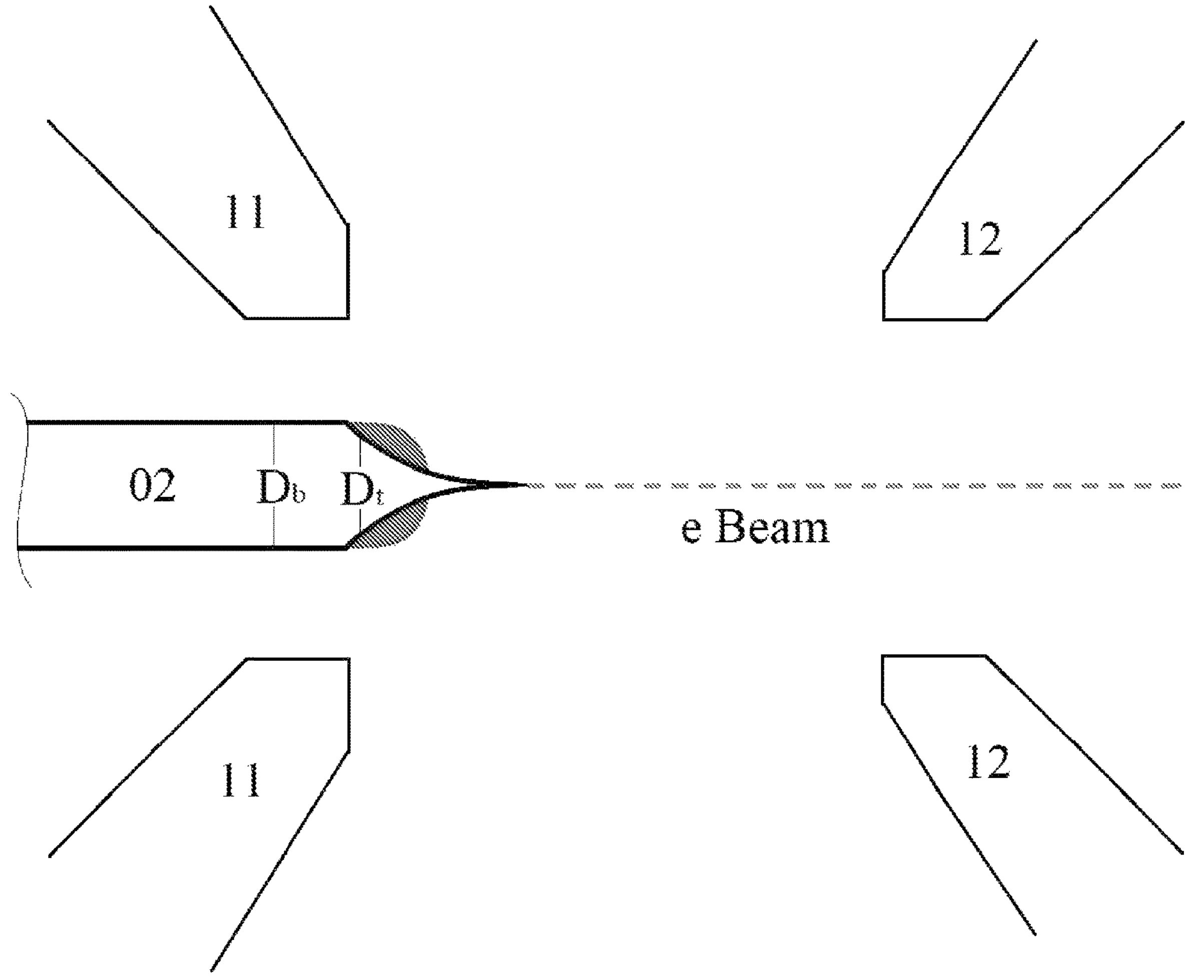
FIG. 11 schematically illustrates a field-emission type electron source with a suppressor electrode and an anode electrode in accordance with an exemplary embodiment of the present invention.

As shown in FIG. 11, other known components may be included in the field-emission type electron source 01 and work together with the crystal rod 02, such as suppressor electrode 11 and anode electrode 12. The suppressor electrode 11 is set in a spatial neighborhood of the crystal rod 02, with the apex extending through the center bore of the suppressor electrode 11. In an embodiment, ZrO is not formed through the center bore of suppress electrode 11 at all. ZrO is formed only on a location outside of the suppress electrode 11. Positioning the ZrO in the "hidden" area of the "slimmer" terminus 04 has some special advantages: ZrO will not adversely contact the suppress electrode 11. Micro-arcing between ZrO and the suppress electrode 11 will be induced. The ZrO temperature is cooler than the welded junction. Although it is still hotter than apex 05, evaporation and depletion of ZrO is dramatically reduced, thereby extending the useful life of the Schottky emitter.

In the foregoing specification, embodiments of the present invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicant to be the scope of the invention, is the literal and equivalent scope of the set of claims that issue from this application, in the specific form in which such claims issue, including any subsequent correction.

The invention claimed is:

1. A field-emission type electron source comprising a crystal rod placed in a gaseous medium, wherein the crystal rod is a single-crystal tungsten rod, a $LaB_6$ crystal rod, or a $CeB_6$ crystal rod; wherein the gaseous medium consists of oxygen and a non-oxygen gas, and wherein a molar ratio between oxygen and the non-oxygen gas is greater than 1:1, 10:1, 50:1, or 100:1.

2. The field-emission type electron source according to claim 1, wherein the non-oxygen gas comprises $H_2$, $N_2$, CO, or any mixture thereof.

3. The field-emission type electron source according to claim), wherein the gaseous medium maintains a pressure of from about $10^{-11}$ torr to $10^{-8}$ torr within the electron source.

4. The field-emission type electron source according to claim 1, further comprising a vacuum pump and an oxygen provider such as an oxygen tank with a releasing valve, wherein said gaseous medium is formed by:

(i) vacuuming an air medium within the electron source to a first pressure P1;

(ii) releasing oxygen from the oxygen provider into the air medium from step (i) to generate a gaseous medium having a second pressure P2, and P2>P1; and (iii) dynamically maintaining the second pressure P2 of the gaseous medium by continuously vacuuming the electron source while continuously releasing oxygen into the electron source.

5. The field-emission type electron source according to claim 4, wherein P1 is in the range of about $10^{-12}$ torr~ $10^{-9}$ torr, P2 is in the range of about $10^{-11}$~$10^{-8}$ torr, and P2>P1.

6. The field-emission type electron source according to claim 4, wherein the crystal rod has a sharpened terminus extending from a rod body, wherein the rod body immediately adjacent to the terminus has a diameter $D_b$, and the terminus is so sharpened that its diameter $D_t$ ($D_t<D_b$) is decreased to a minimal value $D_{t0}$ at the apex of the terminus.

7. The field-emission type electron source according to claim 6, wherein the crystal rod is selected from a single-crystal tungsten rod with a W(110) tip facet (or apex facet) in the sharpened terminus, a single-crystal tungsten rod with a W(310) tip facet (or apex facet) in the sharpened terminus, a $LaB_6$ crystal rod, or a $CeB_6$ crystal rod; and wherein the electron source is configured for cold field emission.

8. The field-emission type electron source according to claim 6, wherein (1) the crystal rod is a single-crystal tungsten rod, (2) the terminus has a length Lt along an elongation direction of the tungsten rod; and (3) the terminus is so sharpened that its diameter $D_t$ ($D_t<D_b$) is decreased non-linearly along the length Lt from a value that is slightly smaller than Db to a minimal value Dt0 at the apex of the terminus; and (4) a mass of ZrO on a portion of the surface, or the entire surface, of the sharpened terminus.

9. The field-emission type electron source according to claim 6, wherein (1) the crystal rod is a single-crystal tungsten rod; (2) a mass of ZrO formed only on a portion of the surface, or the entire surface, of the sharpened terminus; wherein no ZrO is formed on the single-crystal tungsten rod except the sharpened terminus.

10. The field-emission type electron source according to claim 9, wherein the terminus has a length $L_t$ along an elongation direction of the tungsten rod; and wherein the diameter $D_t$ is decreased non-linearly along the length $L_t$ from a value that is slightly smaller than $D_b$ to a minimal value $D_{t0}$ at the apex of the terminus.

11. The field-emission type electron source according to claim 10, wherein the terminus is sharpened by DC electrolytic polishing.

12. The field-emission type electron source according to claim 10, wherein the diameter $D_t$ at any position of the terminus is smaller than the would-be $D_t$ at the same position if the terminus's diameter $D_t$ is decreased linearly along the length $L_t$ from a value that is slightly smaller than $D_b$ to a minimal value $D_{t0}$ at the apex of the terminus.

13. The field-emission type electron source according to claim 12, wherein the terminus is sharpened by W(100) DC electrolytic polishing, and the single-crystal tungsten rod has a W(100) tip facet (or apex facet) in the sharpened terminus.

14. The field-emission type electron source according to claim 9, wherein the electron source is configured for thermal field emission.

15. The field-emission type electron source according to claim 9, wherein the terminus has a length $L_t$ along an elongation direction of the tungsten rod; and wherein the diameter $D_t$ is decreased linearly along the length $L_t$ from a value that is slightly smaller than $D_b$ to a minimal value $D_{t0}$ at the apex of the terminus.

16. The field-emission type electron source according to claim 15, wherein the terminus is sharpened by AC electrolytic polishing.

17. The field-emission type electron source according to claim 9, wherein the mass of ZrO is on the surface of a segment of the sharpened terminus immediately adjacent to the rod body, and wherein the segment has a length of (30~80)%×Lt along the elongation direction of the tungsten rod.

18. A charged particle beam device comprising a field-emission type electron source, wherein the field-emission type electron source comprises a crystal rod placed in a gaseous medium, wherein the crystal rod is a single-crystal tungsten rod, a $LaB_6$ crystal rod, or a $CeB_6$ crystal rod; wherein the gaseous medium consists of oxygen and a non-oxygen gas, and wherein a molar ratio between oxygen and the non-oxygen gas is greater than 1:1, 10:1, 50:1, or 100:1.

19. The charged particle beam device according to claim 18, wherein the field-emission type electron source further comprises a suppressor electrode, an anode electrode, a vacuum pump, and an oxygen provider.

20. The charged particle beam device according to claim 18, which is an electron microscope, a semiconductor electron microscope equipment, a critical dimension examine tool, an electron beam tester, an Auger electron spectrometer, an electron beam lithography apparatus, or other electron beam related systems.

* * * * *